(12) United States Patent
Mansfield

(10) Patent No.: US 6,704,346 B1
(45) Date of Patent: Mar. 9, 2004

(54) METHOD AND APPARATUS TO PROVIDE IMPROVED MICROWAVE INTERFERENCE ROBUSTNESS IN RF COMMUNICATIONS DEVICES

(75) Inventor: Carl Mansfield, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/527,224

(22) Filed: Mar. 16, 2000

(51) Int. Cl.[7] .......................... H04B 15/00; H04K 1/00; H04L 27/30
(52) U.S. Cl. ................. 375/136; 375/133; 370/330; 455/452.1; 455/452.2
(58) Field of Search .................... 375/132, 133, 375/134, 135, 136, 137; 455/464, 450, 452.1, 452.2; 370/330, 337

(56) References Cited

U.S. PATENT DOCUMENTS

| | | | |
|---|---|---|---|
| 4,479,215 A | | 10/1984 | Baker |
| 5,428,815 A | * | 6/1995 | Grube .................... 455/447 |
| 5,444,696 A | | 8/1995 | Petranovich |
| 5,574,979 A | | 11/1996 | West |
| 5,657,358 A | | 8/1997 | Panech et al. |
| 5,687,194 A | | 11/1997 | Panech et al. |
| 5,710,762 A | | 1/1998 | Petranovich |
| 5,734,678 A | | 3/1998 | Panech et al. |
| 5,737,359 A | * | 4/1998 | Koivu ...................... 375/133 |
| 5,754,947 A | | 5/1998 | Tanabe et al. |
| 5,784,402 A | | 7/1998 | Feher |
| 5,852,604 A | | 12/1998 | Cooley et al. |
| 5,875,180 A | | 2/1999 | Wiedeman et al. |
| 5,884,171 A | | 3/1999 | Tanabe et al. |
| 5,937,002 A | * | 8/1999 | Andersson et al. ......... 375/131 |
| 5,946,624 A | * | 8/1999 | Petranovich et al. ....... 455/447 |
| 6,032,046 A | * | 2/2000 | Nakano ..................... 455/450 |
| 6,249,540 B1 | * | 6/2001 | Dicker et al. ............. 375/133 |

* cited by examiner

Primary Examiner—Phoung Phu
(74) Attorney, Agent, or Firm—Robert D. Varitz, P.C.

(57) ABSTRACT

A RF communications system and method having improved RF interference characteristics for use with at least a pair of RF transceivers which communicate using a packet transfer protocol, in a frequency hopping scheme, wherein the packets may be of various lengths, wherein each frequency occupies a frequency channel slot in a RF band, and wherein a subsequent frequency is known, including, in at least one of the transceivers: a detector for detecting distressed channel frequencies having an unacceptable level of interference thereon; a tracker for keeping track of the distressed channel frequencies and of channel frequencies which are not distressed; a look-ahead mechanism for maintaining a list of bad channel frequencies of future slots; a scheduling algorithm to avoid beginning packet transmission on bad channel frequency slots; and a frequency selector for selecting a next transmission frequency from the available non-distressed channel frequencies.

14 Claims, 6 Drawing Sheets

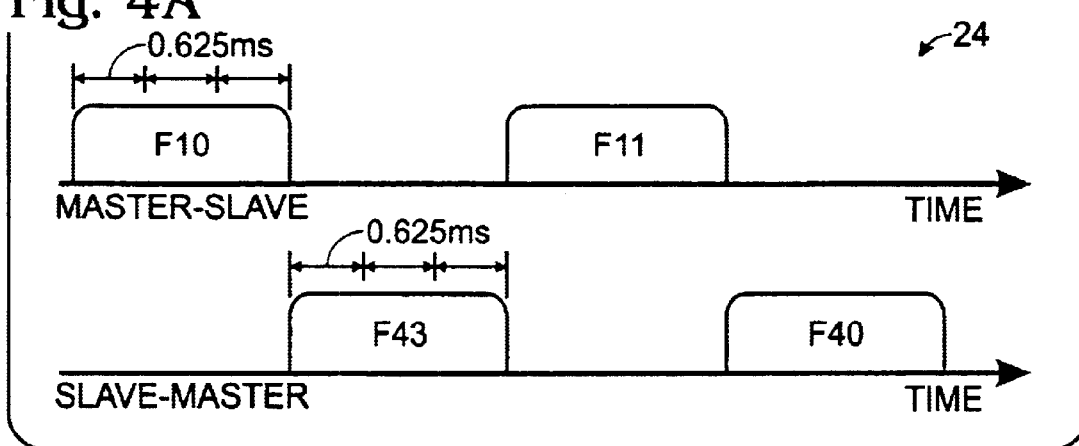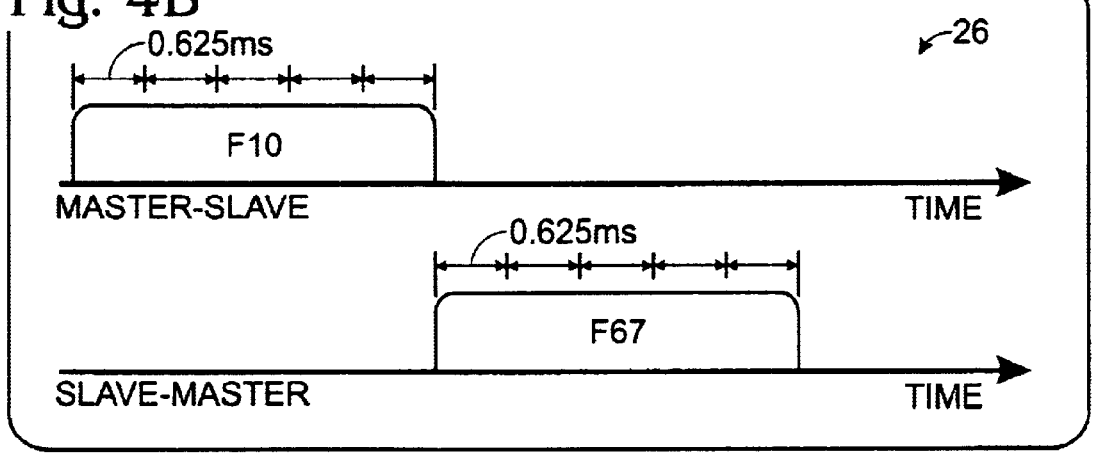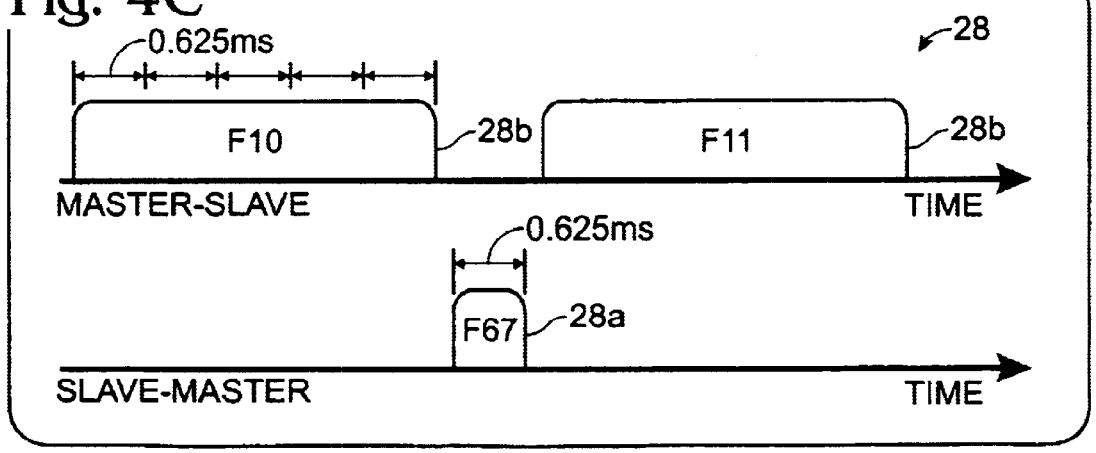

METHOD AND APPARATUS TO PROVIDE IMPROVED MICROWAVE INTERFERENCE ROBUSTNESS IN RF COMMUNICATIONS DEVICES

FIELD OF THE

This invention relates to multi-media communications, and specifically to a method and apparatus to limit microwave interference in unlicensed RF devices.

BACKGROUND OF THE INVENTION

Bluetooth (BT) is a short-range communications specification, designed for operation in the 2.4 GHz microwave frequency industrial, scientific and medical (ISM) band. Bluetooth™ is a trademark/service mark of Telefonaktiebolaget LM Ericsson, of Stockholm, Sweden for telecommunication equipment, computer communication equipment, including radio modems; and telecommunication and computer communication services. BT is intended primarily as a replacement for cables, providing connectivity over a short range between, for example, a PDA and Laptop or a Laptop and Cellular Phone. Bluetooth is also an RF alternative to IrDA connectivity. BT devices operate in accordance with the FCC Part 15 rules for unlicensed operation. It must share this band with a number of other communications devices, also regulated by Part 15, e.g., 802.11 W-LAN, as well as consumer microwave devices, regulated by FCC rules Part 18, e.g., microwave ovens and RF lighting.

Devices regulated by Part 18, such as microwave ovens, are considered primary users of the ISM band. Communications devices, regulated by Part 15, are considered secondary users and are required to have a low probability of creating interference and be sufficiently robust to avoid malfunctioning as a result of interference from other ISM band devices, which operate under either Part 15 or Part 18. For these reasons, Part 15 rules require the use of spread spectrum techniques, either frequency hopping or direct sequence. The BT specification is no exception, and has adopted a frequency-hopping scheme. BT hops in a pseudo-random manner among the 23 or 79 different channel frequencies in the ISM band, at a rate of 1600 hops per second.

If another ISM band device, e.g., a communications system or oven, is operating in close proximity to a BT device, high interference will be present in some portion of the ISM band. Thus, some number of the 23 or 79 channel frequencies available to BT will be unusable for reliable data transfer. However, because BT hops in a pseudo-random manner among these channel frequencies, a BT device will spend only a small portion of its time on any bad channel frequency and will continue to transmit data on the unaffected channels.

The net result of this interference on BT channels is that a BT device will continue to operate, but will operate at reduced performance, e.g., with increased delay, degraded voice or video quality, or reduced data throughput. This reduction in throughput, or Quality of Service (QoS), may be substantial and noticeable to an end user of a BT device.

Prior art in the unlicensed band avoids interference problems by simply hopping in a random manner. While this allows a device to continue communicating, it does not provide a means to mitigate the resulting throughput and QoS reduction. Other systems employ similar techniques in which the channel frequency usage pattern is directly modified to avoid bad channels.

U.S. Pat. No. 4,479,215 to Baker, granted Oct. 23, 1984, for Power-line carrier communications system with interference avoidance capability, describes a system which uses two channels in a power-line communications system to allow a switch in channel frequency if the current channel frequency is experiencing bad interference.

U.S. Pat. No. 5,444,696 to Petranovich, granted Aug. 22, 1995, for Frame structure using consecutive slot assignments for mobile communications, provide a means to provide a TDMA mobile station more time to scan alternative frequencies in order to perform more effective cellular handover.

U.S. Pat. No. 5,574,979 to West, granted Nov. 12, 1996, for Periodic interference avoidance in a wireless radio frequency communication system, describes a signal processing techniques to mitigate problems caused by a periodic interference source, i.e., one which pulses interference on a regular time basis.

U.S. Pat. No. 5,734,678, granted Aug. 12, 1997, U.S. Pat. No. 5,687,194, granted Nov. 11, 1997, and U.S. Pat. No. 5,657,358, granted Mar. 31, 1998, all to Paneth et al., and all entitled Subscriber RF telephone-system for providing multiple speech and/or data signals simultaneously over either a single or a plurality of RF channels, describe a robust communications system design which does not employ interference avoidance techniques.

U.S. Pat. No. 5,710,762 to Petranovich, granted Jan. 20, 1998, for Frame structure having non-symmetrical slot assignments for mobile communications, describes the provision of a TDMA mobile station which is given more time to scan alternative frequencies in order to perform more effective cellular handover.

U.S. Pat. No. 5,754,947, granted May 19, 1998, and U.S. Pat. No. 5,884,171, granted Mar. 16, 1999, both to Tanabe et al., and both for Radio communication apparatus and method for preventing hidden terminals from interrupting communications, are related to avoiding the classic hidden terminal interference problem of wireless communications. This is essentially a technique to avoid starting transmission on an interfered channel.

U.S. Pat. No. 5,784,402 granted Jul. 21, 1998, to Feher, for FMOD transceivers including continuous and burst operated TDMA, FDMA, spread spectrum CDMA, WCDMA and CSMA, describes an advanced modulation technique.

U.S. Pat. No. 5,852,604 to Cooley et al., granted Dec. 22, 1998, for Modularly clustered radiotelephone system, describes an improved power saving technique using synthesizer techniques.

U.S. Pat. No. 5,875,180 to Wiedeman et al., granted Feb. 23, 1999, for Satellite telephone interference avoidance system, describes use of techniques to avoid interference problems in a geographical subset of a satellite's communications footprint due to location of terrestrial systems using the same frequency in these regions. It statically assigns frequencies based on this non-changing interference environment.

SUMMARY OF THE INVENTION

A RF communications system having improved RF interference characteristics for use with at least a pair of RF transceivers which communicate using a packet transfer protocol, in a frequency hopping scheme, wherein the packets may be of various lengths, wherein each frequency occupies a frequency channel slot in a RF band, and wherein a subsequent frequency is known, including, in at least one of the transceivers: a detector for detecting distressed channel frequencies having an unacceptable level of interference thereon; a tracker for keeping track of the distressed channel frequencies and of channel frequencies which are not distressed; and a frequency selector for selecting a next transmission frequency from the available non-distressed channel frequencies, including a look-ahead mechanism for determining which channel frequencies will be used in subsequent frequency channel slots, and an interference avoidance mechanism for determining, from said tracker, which of the subsequent frequency channel slots is scheduled to operate at a distressed frequency, and wherein said frequency selector avoids beginning transmissions in any frequency channel slot associated with a distressed channel frequency by adjusting the schedule.

A method of improving RF interference characteristics in a RF communications system having at least a pair of RF transceivers which communicate using a packet transfer protocol, in a frequency hopping scheme, wherein the packets may be of various lengths, wherein each frequency occupies a frequency channel slot in a RF band, and wherein a subsequent frequency is known, including, in at least one of the transceivers: detecting distressed channel frequencies having an unacceptable level of interference thereon; tracking distressed frequencies; and selecting for use by the system only those channel frequencies which are not distressed.

An object of the invention is to provide a packet scheduling scheme employing the long packet types allowed in BT to avoid transmitting on a channel frequency having interference present thereon.

Another object of the invention is to maintain a high data throughput and QoS, despite the presence of a nearby interferer, such as a microwave oven.

A further object of the invention is to provide an improved BT scheme which does not violate any of the requirements of the BT specification.

Another object of the invention is to provide a BT transceiver which is operable with legacy BT devices which do not employ this scheme.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIG. 4 depicts examples of a BT transmission mechanism using multislot packets.

DETAILED DESCRIPTION OF THE PREFERRED EMBODIMENT

Throughput/Quality of Service (QoS) reduction in Bluetooth™ (BT) devices, and solution of such reduction is the key problem addressed by this invention. The mechanism described herein uses a packet scheduling scheme employing the long packet types allowed in BT to avoid transmitting on a channel frequency with interference. It does not avoid bad channel frequencies by directly modifying the frequency hopping pattern or frequency usage pattern inherent in BT as is done in non-BT prior art.

The invention includes a packet scheduling algorithm, and other functions so that a BT transceiver avoids using channel frequencies having interference present thereon. This scheme allows the BT device to maintain a high data throughput and QoS, despite the presence of a nearby interferer, such as a microwave oven. The invention does not violate any of the requirements of the BT specification. A device which implements this invention is interoperable with other BT devices, including legacy BT devices that do not incorporate the scheme of the invention.

Bluetooth™ Frequency Hopping

BT devices hop in a pseudo-random manner following a frequency hopping protocol among the 79 predetermined carrier frequencies available in the industrial, scientific, medical (ISM) unlicensed band. BT devices communicate using a packet transfer protocol. In reality, due to regional differences, in certain countries there are only 23 carrier frequencies available. In such instances, BT hops in a pseudo random manner among this smaller number of channel frequencies. A BT device operates in sequential frames, wherein each frame is of 0.625 ms duration. A BT device hops to a new carrier frequency at the end of every 0.625 ms frame, which results in basic standard hopping rate of 1600 hops/second, as illustrated in time line 10 in FIG. 1. As illustrated, time line 10 begins with a BT device using frequency (F) F10, then F3, F23, and so on. The BT specification selects the next frequency pseudo-randomly immediately before use. Prior art BT devices have no need to look-ahead, unlike BT devices incorporating the invention hereof.

Figure 2:
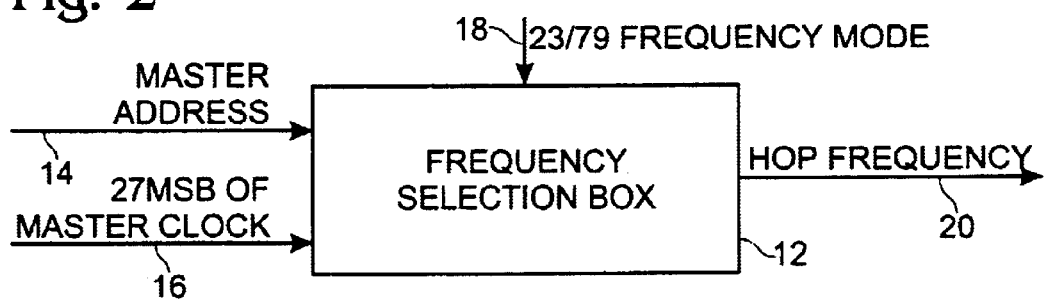
FIG. 2 depicts a BT frequency selection box.

A piconet is a small, BT wireless network involving one master device, which controls the network, and one or more slave devices, which are part of the piconet. Each BT piconet hops in a sequence which is determined by an algorithm implemented in a frequency selection box 12 in FIG. 2. Box 12 has a number of inputs, including a piconet master's BT address 14; the 27 most significant bits (MSBs) of the piconet master's clock 16, which increments by "1" in every 0.625 ms slot boundary; and a flag 18, indicating whether 23 or 79 frequency mode is in use. An algorithm in box 12, in accordance with the BT specification, determines the next BT channel frequency. As every BT device operates in the same pseudo-random sequence, once the master clock information is known and the BT devices are synchronized, the BT devices linked to each other will select the same channel frequency. The result is the selected BT channel frequency for the next hop.

Frequency selection box 12 is implemented in all BT devices. Typically, it is implemented in dedicated hardware, however, there is no restriction in the BT specification, and box 12 may be implemented in software or firmware.

Error correction

Each BT packet includes a cyclic redundancy check (CRC) code, which may be used to detect if any errors occur during transmission. If errors are present, the BT protocol implements a repeat transmission scheme using acknowledgments and automatic repeat request (ARQ). For example, if a BT device hops to a channel frequency which has interference, resulting in errors in the packet, the CRC will detect the errors, and a request for a repeat transmission will be returned to the sender. Because the connection will have already hopped to a different channel frequency, the repeat transmission will occur on a different channel frequency, where hopefully there is no interference.

Multi-slot Packets

Figure 1:
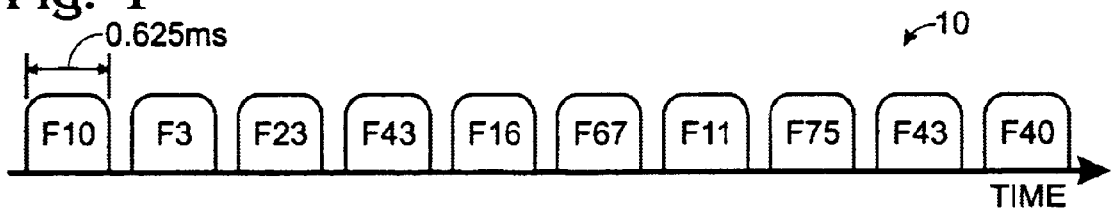
FIG. 1 depicts a basic Bluetooth™ hopping scheme.
Figure 3:
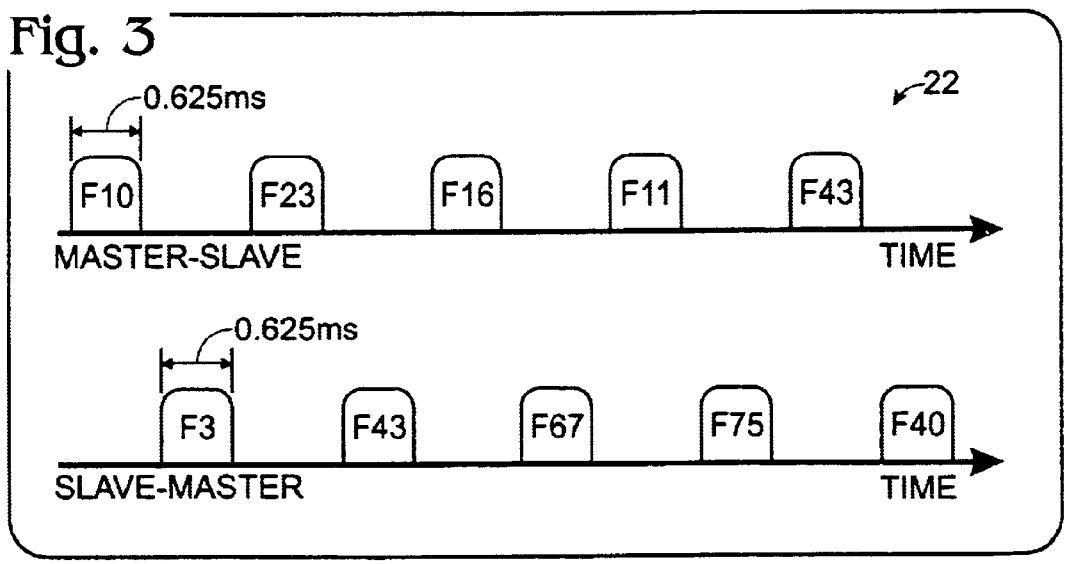
FIG. 3 depicts BT communications using single-slot packets.

Basic BT operation uses "single slot" packets, referred to as DM1 (data-medium rate) and DH1 (data-high rate) packets, which each occupy a single 0.625 ms frame. As illustrated in FIG. 3, transmissions between master and slave employ time division duplex (TDD) using the same hopping sequence as illustrated in FIG. 1. The scheme of time line 10, for example, has a master BT device transmitting on F10, a slave BT device transmitting on F3, the master transmitting on F23, and so on, for single slot packet transmissions.

This communication mode provides completely symmetric data transfer at rates of either 108.8 kilobytes per second (kbps) or 172.8 kbps. These rates assume no errors or retransmissions on the link. If the link has errors and requires retransmission, the actual data rates will be reduced. The 108.8 kbps rate is for DM1 packets, which have additional overhead of forward error correction (FEC) protection, while the 172.8 kbps rate is for DH1 packets, which do not have FEC protection.

In order to provide higher data rates and asymmetric data transfers, BT supports additional packet types, which occupy either three contiguous BT slots, and are referred to as DM3 and DH3 packets, or five contiguous BT slots, and are referred to as DM5 and DH5 packets. Higher rates may be provided with these packet types because the ratio of packet overhead, e.g. header information, to user data is lower. Asymmetric data transfer is supported by using different length packets in each transmission direction. Examples of these mechanisms are illustrated in FIG. 4. FIG. 4a depicts symmetric transmission 24 with 3-slot packets (DM3 or DH3), at 258.1 kbps (DM3) or 390.4 kbps (DH3); FIG. 4b depicts symmetric transmission 26 with 5-slot packets (DM5 or DH5) at 286.7 kbps (DM5) or 433.9 kbps (DH5); and FIG. 4c depicts fully asymmetric transmission 28 with 1-slot (DM1 or DH1) packets 28a, and 5-slot (DM5 or DH5) packets 28b, at a master-to-slave data-rate of 477.8 kbps (DM5) or 723.2 kbps (DH5), and slave-to-master data rate of 36.3 kbps (DM1) or 57.6 kbps (DH1).

The amount of data which may be transferred using the various packets varies considerably, and is not a mathematical progression. The BT specification provides for a guard time between slots. Additionally, each packet includes two bytes of header information. FEC is provided only in DM-type packets. A DM1 packet may contain up to 18 bytes of information, including the two byte header, providing up to 16 bytes of data transfer capability. A DH1 packet may contain up to 28 bytes of information, a DM3 up to 123 bytes, a DH3 up to 185 bytes, a DM5 up to 226 bytes, and a DH5 up to 341 bytes. Thus, it is readily apparent that a single DH5 packet containing up to 339 bytes of data transfers considerably more than five DH1 packets, each transferring up to 26 bytes of data, for 130 bytes total.

Selection of Packet Type

The packet header, contained in every BT packet, defines the packet type which follows. This allows any BT communications device to dynamically change packet length on a per packet basis. Packet length selection is, in legacy BT devices, typically based on the amount of data the device has to send. For example, if a legacy device only has enough data to fill a DH1 packet, it will use a DH1 packet. However, if it has enough data to fill a DH5 packet, it will use a DH5 packet because it is generally more efficient to use longer packets where possible, as longer packets support higher data-rates. The BT specification does not provide rigid rules for packet length selection, which selection choice is left to the manufacturers of the devices.

Another important point to note about BT communication devices is that the master device has some control over the allowed packet types used by the slave devices with which it communicates. This is done during the connection establishment procedure, known as "linking.". The master device may, for example, establish a connection with a slave device, allowing that slave to only use DH1 packets. Alternatively, the master may establish a connection with a slave allowing DH1, DH3 or DH5 packets to be used. In the latter case, the slave device makes its own decision on which type to use, potentially on a packet-by-packet basis.

Frequency Hopping With Multi-slot Packets

The use of multi-slot packets results in deviations from the expected frequency hopping pattern illustrated in FIG. 1. No hopping or change of frequency may occur in the middle of a multi-slot packet. Rather, each such packet, whether 3 or 5 slots in length, remains at the channel frequency determined by the slot in which it transmission commenced.

This is apparent by comparing FIGS. 4a–c with FIG. 1. For example, FIG. 1 requires, for the illustrated piconet, the second slot to use channel frequency F3. However, in the examples illustrated in FIGS. 4a–c, the master device is part way through a multi-slot packet in the second slot and, consequently, the channel frequency used is F10, i.e. the same as the first slot, rather than the channel frequency which frequency selection box 12 indicates.

Whenever transmission of a new packet begins, the channel frequency used is that which is assigned to that slot by frequency selector box 12. For example, referring to FIGS. 1 and 4a, the three-slot packet results in channel frequencies F3 and F23, which are scheduled in the second and third slots, respectively, being skipped. The fourth slot is on channel frequency F43 in both cases, because transmission of a new packet is started in slot four in both examples. The frequency usage for the four cases of FIGS. 3 and 4 are summarized Table 1:

TABLE 1

Timeslot Selector Box Frequency

| Time-slot | Selector Box Frequency | Frequency actually used for transmission for each example scenario | | | |
|---|---|---|---|---|---|
| | | FIG. 3 | FIG. 4a | FIG. 4b | FIG. 4c |
| 1 | 10 | 10 | 10 | 10 | 10 |
| 2 | 3 | 3 | 10 | 10 | 10 |
| 3 | 23 | 23 | 10 | 10 | 10 |
| 4 | 43 | 43 | 43 | 10 | 10 |
| 5 | 16 | 16 | 43 | 10 | 10 |
| 6 | 67 | 67 | 43 | 67 | 67 |
| 7 | 11 | 11 | 11 | 67 | 11 |
| 8 | 75 | 75 | 11 | 67 | 11 |
| 9 | 43 | 43 | 11 | 67 | 11 |
| 10 | 40 | 40 | 40 | 67 | 11 |

This skipping of channel frequencies, which channel frequency would otherwise be used, is a side effect of the slot design and hopping techniques used in BT. The invention makes deliberate and intentional use of this side effect, to improve the performance of a BT connection under conditions of interference, such as from a microwave oven.

An important aspect of the invention is that the BT system is modified to look ahead to see which BT channel frequencies are soon be used, and, when comparing the potential channel frequencies with a separately maintained channel frequency blacklist of channel frequencies having unacceptable interference thereon, the BT system dynamically adapts among the different length BT packet lengths to avoid transmission on blacklisted channel frequencies. The system of the invention is then able to maintain higher performance under conditions of interference by avoiding the channel frequencies on the blacklist, which are known to suffer from high interference or poor transmission quality.

Figure 5:
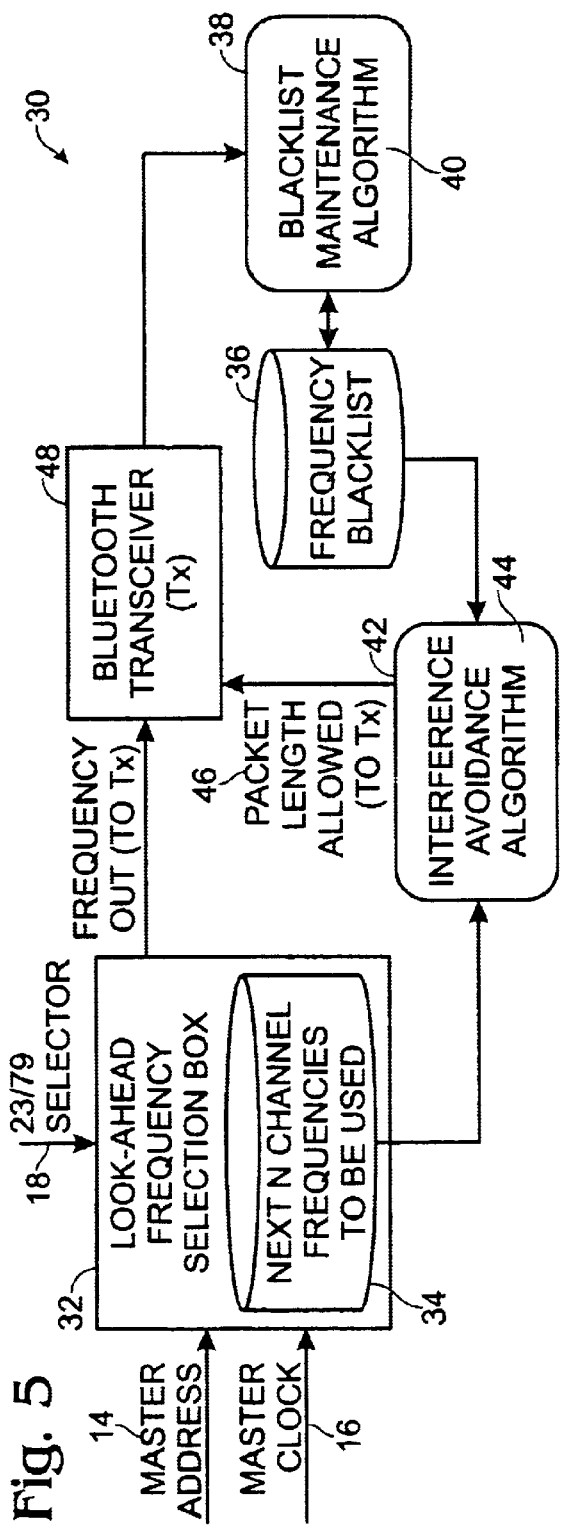
FIG. 5 is a block diagram of the invention.

The system of the invention is depicted generally at 30 in FIG. 5, and includes a modified frequency selection box 32 which provides a "look-ahead" capability, or mechanism, which determines and stores, in a frequency storage mechanism 34, the next few "future channel frequencies" which are to be selected. A channel frequency blacklist table 36 contains a list of BT channel frequencies that are known to have interference. A channel frequency blacklist maintenance mechanism 38 has a channel frequency blacklist algorithm 40 to determine and maintain channel frequency blacklist table 36. A interference avoidance mechanism 42, having an interference avoidance algorithm 44, uses the channel frequency blacklist and stored future channel frequencies to dynamically adapt the chosen BT packet type 46 among Dx1, Dx3, Dx5, where "x" denotes either M- or H-type packets. This algorithm selects the allowed next length packet(s) for transmission by a BT transceiver 48. Note that selection between M- and H-type packets is not directly relevant to this invention.

"Look ahead" Frequency Selector Box

The usual BT frequency selector box simply maintains synchronization with the 27 MSB of the master's clock, incrementing by 1 every 0.625 ms at each slot boundary. In this invention, the frequency selector box is modified to clock ahead of the 27 MSB of the master's clock. The number of 0.625 ms slots which the device must look-ahead is dependent on the complexity of interference avoidance algorithm 44. However, in general terms, it is necessary for the device to look-ahead at least far enough to see the frequencies allocated to: (1) the furthermost slot away in which the other device could start its next transmission; and (2) the furthermost slot away after the other device's transmission, in which this device could be required to start transmission.

Figure 6:
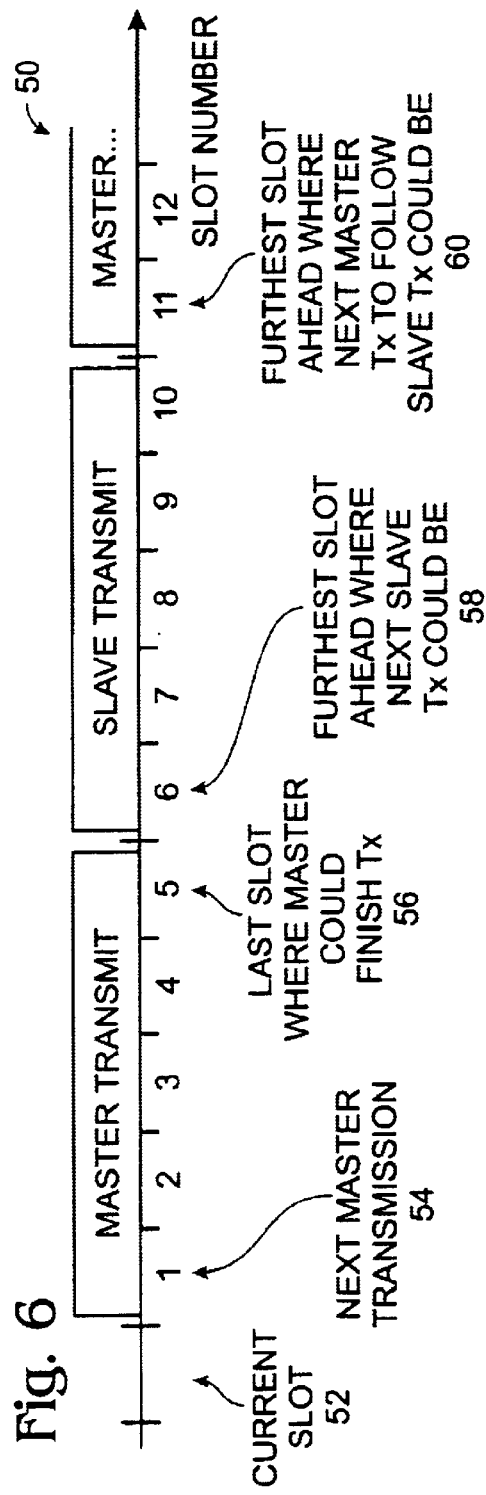
FIG. 6 is a schematic representation of a "look-ahead" feature of the invention.

Moving now to FIG. 6, the look-ahead distance parameters are depicted generally at 50. The slots, numbered Ø to 12, where the next two transmissions may occur clearly depend on the packet lengths used in the next two transmissions by the two communicating devices. Beginning at the current slot Ø, 52, the next transmission begins at slot 1, 54, and the furthermost point in the future where the transmission could finish is in slot 5, 56, corresponding to a Dx5-type packet. The next transmission by the other transceiver device then starts at slot 6, 58. The transmission, of course, would begin in an earlier-in-time slot were the first master transmitted packet to be of the Dx1- or Dx3-type. However, the furthermost out which these transmissions may occur defines the desired minimum length of the look-ahead capability. This clearly is defined by the case where both devices use the longest, i.e., length five, packet types, and results in the second master transmission beginning in slot 11, 60. It should be appreciated that the master-slave roles may be interchanged, e.g., if a slave implements this invention, the same figure applies, with the slave and master designations swapped.

From FIG. 6, it is clear that a good selection of the look-ahead distance is at least 11 slots, 60. However, there is no reason why a longer or shorter look-ahead distance may not be adopted. A shorter look-ahead results in a more limited embodiment of the invention, which likely has restricted performance, while a longer look-ahead may support more complex avoidance algorithms than those defined herein, e.g., algorithms which look-ahead by more than the next two transmissions. It is also possible that a slightly longer look-ahead may be required to provide a device incorporating the invention with more time to process the interference avoidance algorithm to determine which packet length to use. This may be important where the device has only a low power micro-controller, or where there are other real-time constraints on the micro-controller.

Figure 7:
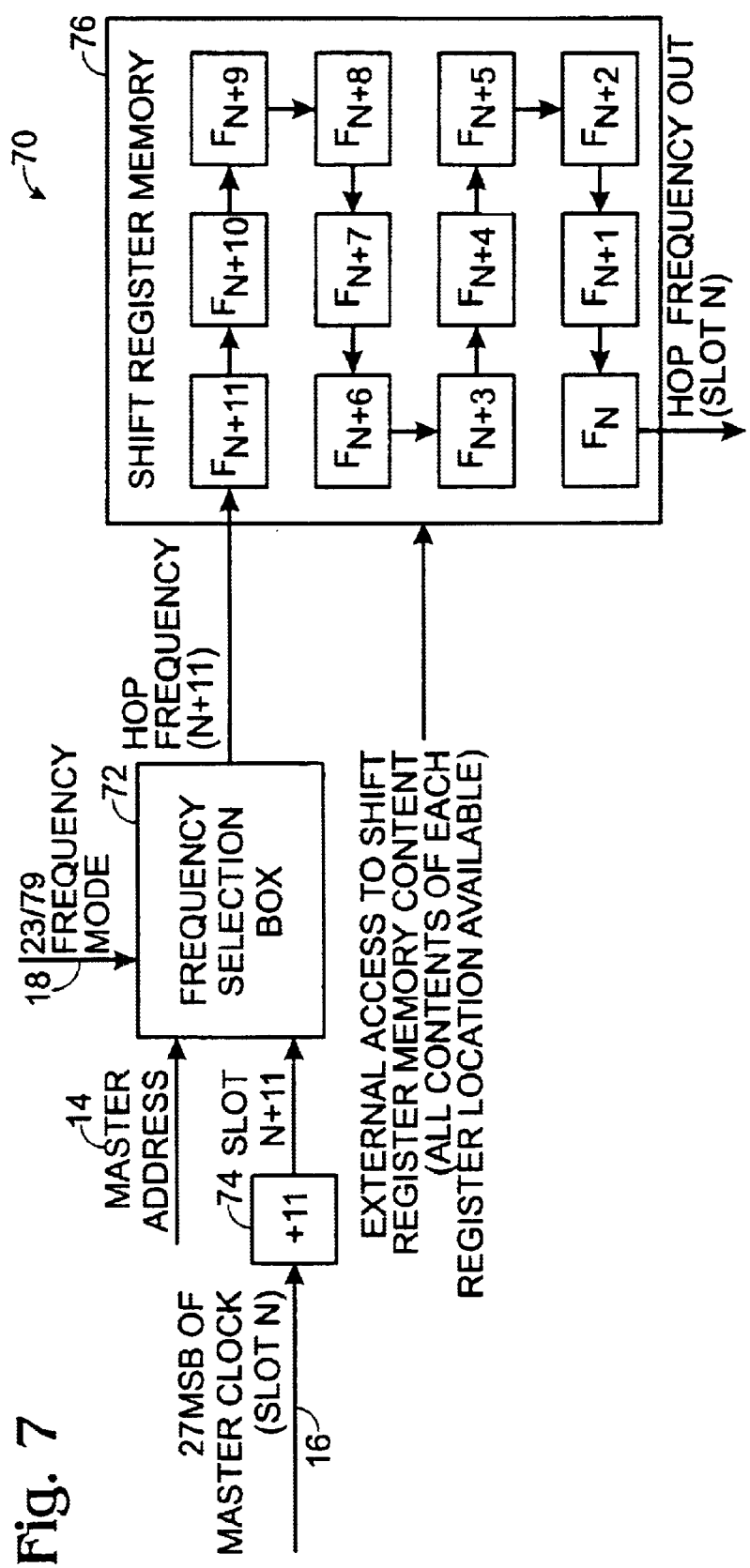
FIG. 7 depicts a frequency selection box having "look-ahead" capability.

FIG. 7 depicts a portion of system 30 generally at 70, wherein a frequency selector box 72 implements a look ahead capability with a look-ahead of 11 slots, 74. A shift register 76 is provided and the look ahead frequencies stored in every location of the shift register are capable of being read externally. These frequencies are used as input to interference avoidance algorithm 44 of FIG. 5. Other implementations in software, or using memory devices other than a shift register, may be used.

Frequency Black-list Table—The Tracker

There are 79 channel frequencies available to BT. In some countries, only 23 channel frequencies are used due to regional regulatory requirements. When operating in regions that permit only 23 channel frequencies to be used, blacklist table 36 (FIG. 5 and Table 2) only needs to be maintained for these 23 channel frequencies.

Frequency blacklist table 36 is located in a memory that stores data regarding the known quality of each of the 79 channel frequencies to track which of the 79 channel frequencies operate at a distressed frequency. In its simplest form, this table consists of one bit per channel frequency to indicate whether the channel frequency is either "good" or "bad," wherein a "bad" channel frequency is designated to be in a distressed condition. The frequency blacklist table is maintained by blacklist maintenance algorithm 40, and used by interference avoidance algorithm 44.

Blacklist Maintenance Algorithm—The Detector

Blacklist maintenance algorithm 40 is responsible for detecting distressed channel frequencies and for maintaining the frequency blacklist table. Blacklist maintenance algorithm 40 may have a variety of forms. The examples which follow are provided to illustrate the minimum requirements for blacklist maintenance algorithm 40.

In the first embodiment of blacklist maintenance algorithm 40, a BT device includes an additional scanning receiver which works with blacklist maintenance algorithm 40. This receiver scans all of the 79 or 23 BT channel frequencies, taking care to avoid scanning a channel frequency when it is in use by the device for communications. Channels with an received signal strength indicator (RSSI) above a certain threshold, indicating significant interference, are marked in the blacklist as "bad," or distressed, channel frequencies. Conversely, channel frequencies marked "bad" are upgraded to "good," or non-distressed, in the blacklist if the RSSI measured on them drops below a certain threshold. Normally, the RSSI threshold for changing a channel frequency from the "bad" to "good" is lower than the RSSI threshold for adding a channel frequency to the "bad" list. This technique, known as hysteresis, is employed to prevent a channel frequency with RSSI close to a threshold from being rapidly and repeatedly changed from good to bad to good to bad, and so on. The RSSI may also be required to be above or below the appropriate thresholds more than once in consecutive measurements to prevent rapid reclassification. The determination of optimum RSSI thresholds, and/or the determination of the number of repeat measurements required to change a channel frequency from or to "bad" status, from the expected interference environment is within the abilities of those of ordinary skill in the art.

A second preferred embodiment does not include a scanning receiver and takes advantage of the fact that BT employs a cyclic redundancy check (CRC) code to determine if transmission errors have occurred. Although certain BT packets, e.g., voice packets, do not employ CRC codes on user data, every BT, packet, except the ID packet, which is infrequently transmitted, includes an 8-bit CRC code protecting the packet header information. An ID packet is used for initial communication purposes, in order to commence a link, so its lack of header CRC is of minimal importance to this invention.

Errors in header information of received packets are directly known because the associated CRC code fails when the packet is decoded. In this case, the decoder acts as a CRC code detector. Errors in transmitted packets may also be indirectly identified in most cases, because the transmitter receives a control message from the other communicating device indicating that an error has occurred. This second embodiment counts header errors only on the received packets and ignores the more complex technique in which the transmitted packet errors are also counted. However, the latter approach may have some performance advantage, albeit at the cost of increased complexity, and may constitute yet another alternate embodiment of the invention.

By counting received header errors associated with each of the 79 channel frequencies, the blacklist maintenance algorithm may add "bad" channels to the blacklist. There are a number of ways in which this error counting may be used to add channels to the blacklist, all of which will have broadly similar performance once properly optimized. For example, (1) the algorithm may simply mark a channel frequency as "bad" when X consecutive errors in using the channel frequency have occurred, where X is a number from, perhaps, 1–5; or (2) the algorithm may mark a channel frequency as "bad" when X transmissions out of the last Y transmissions on that channel, X<Y, were in error. These types of simple error-counting algorithms are well known to those of ordinary skill in the art. For example, existing cellular communications systems, e.g., GSM, employ error-counting techniques such as these to determine when to initiate a handover to a new cell. As used herein, "error" means that whatever condition is set to mark a channel as bad has occurred, whether that condition is a number of CRC errors, or a percentage of bad transmissions.

The drawback to this technique, as thus far described, is that this error counting algorithm, in theory, has no way to change a channel frequency marked "bad" back to "good". The reason for this is that any channel frequency marked as "bad" will no longer be used in the communication, assuming that the avoidance algorithm operates at 100% effectiveness. This means that header error data will cease to be collected on a channel frequency marked "bad." The system effectively ignores the "bad" channel, and should the interference disappear, the previously "bad" channel frequency cannot directly be returned to a "good" rating. For this reason, the error counting blacklist maintenance algorithm also includes a time-stamp indicating when each channel frequency is marked "bad". After a predetermined period of time, referred to as the validity time of "bad" rating, $T_v$, a "bad" channel frequency is automatically be returned to a "good" rating so that it may once again be used. Should the interference remain, error counts on the channel frequency will rapidly return it to a "bad" rating. It is expected that $T_v$ will be of the order of several tens of seconds or more, which value may be readily determined by one of ordinary skill in the art from the expected interference environment to be encountered.

Advanced Blacklist Table Maintenance Procedures

The mechanisms described above mark channels as "good" or "bad" in the blacklist on the basis of interference or error measurement. Where excessive interference is present, too many channels may become marked as "bad" for the interference avoidance algorithm properly to function. Generally speaking, so long as less than 40–50% of the channels are blacklisted as "bad," the interference-avoidance algorithm will continue to function well. The exact percentage where the interference avoidance algorithms lose potency is dependent on the detailed design of the algorithm, and the number of available channel frequencies, e.g., 23 or 79. Certain management mechanisms may be implemented in the blacklist maintenance algorithm to prevent the number of "bad" blacklisted channels from increasing beyond a certain point. Because the algorithms are relatively robust even in severe interference environments, e.g., where>50% of the channels are "bad," such advanced blacklist table maintenance mechanisms are generally not required, however, their use may be desirable in certain implementations of the invention.

Interference Avoidance Algorithm

Interference avoidance algorithm 44 uses the channel blacklist table and frequency look ahead tables to see whether any of the channels to be assigned over the next few slots are marked in the channel blacklist as "bad," as illustrated in Table 2. An example of this decision process is illustrated generally at 80 in FIG. 8 for the case where the look ahead is 7 slots and the device is operating in 23-frequency mode, which example is shown for simplicity, and will be described in more detail later herein.

Table 2 depicts twenty-three channel frequencies, wherein channel frequencies 1, 2, 6–14, 16–18 and 20–23 are "good" channel frequencies, and channel frequencies 3–5, 15 and 19 are "bad" channel frequencies, as identified in the Channel Blacklist Table. A seven slot Channel Look-Ahead Table is depicted for future slots 1–7. The seven slot schema will be used for the remainder of the explanation of the invention, although a greater number of look-ahead slots, e.g., eleven or more slots, may be used. The seven slot example is provided for the sake of brevity. Transmission alternative options will be described later herein. In the discussion which follows, it is important to distinguish channel frequencies 1 to 23, or 1 to 79, from slots 1 to 7, or 1 to 11, from options 1 to 9.

Under the Channel Frequency Look-Ahead Table, using Dx1 packets, the order of channel frequency selection for the seven slots would be channel frequency 2, 7, 19, 22, 14, 4 and 11. It should be remembered that BT devices which do not incorporate the invention do not look-ahead, except to select the next transmission or reception slot, thus, as used herein, it may be said that a conventional BT device does not look-ahead at all. The Channel Frequency Look-Ahead Table assigns channel frequency 19 to future slot 3 and channel frequency 4 to future slot 6. As these two channel frequencies are on "bad" list in the Channel Blacklist Table, the task for a BT device incorporating the invention is to transmit data so as to avoid beginning transmission in future slots 3 or 6, thus avoiding channel frequencies 19 and 4.

TABLE 2A

Channel Blacklist Table

| Channel Blacklist Table | | | | | | | | | | | |
|---|---|---|---|---|---|---|---|---|---|---|---|
| Ch | 1 | 2 | 3 | 4 | 5 | 6 | 7 | 8 | 9 | 10 | 11 | 12 |
| List | G | G | B | B | B | G | G | G | G | G | G | G |
| Ch | 13 | 14 | 15 | 16 | 17 | 18 | 19 | 20 | 21 | 22 | 23 | |
| List | G | G | B | G | G | B | B | G | G | G | G | |

TABLE 2B

Channel Frequency Look Ahead Table - 7 Slot

| Channel Frequency Look Ahead Table | | | | | | | |
|---|---|---|---|---|---|---|---|
| # of Slots Ahead | 1 | 2 | 3 | 4 | 5 | 6 | 7 |
| Assigned Channel Frequency | 2 | 7 | 19 | 22 | 14 | 4 | 11 |

TABLE 2C

Location of "Bad" Channels in Next Seven Slots

| Location of "Bad" Channels in Next Seven Slots | | | | | | | |
|---|---|---|---|---|---|---|---|
| Slots Ahead | 1 | 2 | 3 | 4 | 5 | 6 | 7 |
| Assigned Channel Rating | G | G | B | G | G | B | G |

Using the information regarding near-future "bad" channel frequency assignments, the interference avoidance algorithm adapts the packet-length to be used in the next transmission(s), so that the "bad" channels may be avoided. This is done by helping to ensure that bad channels fall in a slot, which is in the middle of a longer packet type (Dx3 or Dx5), rather than in a slot, where a new packet transmission commences. Each time a device which implements this algorithm is ready to transmit a new packet, it will select the packet to be used using information provided by interference avoidance algorithm 44.

Algorithm variants that employ these basic interference avoidance principles will be readily apparent to those of ordinary skill in the art on understanding the basic interference avoidance principles which are used in this invention.

Transmission alternatives

An important consideration in implementing this invention is determining the time between two successive transmissions by the same device which implements interference avoidance algorithm 44. Whenever a BT device is ready to transmit a new packet, there are nine possible transmission options involving the three different length packet types that may occur between the next two consecutive transmissions of that device.

These nine options are illustrated in Table 3, where "A" and "B" are the two linked communicating devices. "A" is the device about to transmit next, while "B" is the other device in the communication. Note that "A" may be either a master or slave in the communications.

TABLE 3

Multi-slot Transmission Options

Slots ahead of current slot (A's next transmission starts at slot 1)

| | 1 | 2 | 3 | 4 | 5 | 6 | 7 | 8 | 9 | 10 | 11 |
|---|---|---|---|---|---|---|---|---|---|---|---|
| Option 1 | A (Dx1) | B (Dx1) | A (reset) | | | | | | | | |
| Option 2 | A (Dx1) | | B (Dx3) | | A (reset) | | | | | | |
| Option 3 | A (Dx1) | | | B (Dx5) | | | A (reset) | | | | |
| Option 4 | | A (Dx3) | | B (Dx1) | A (reset) | | | | | | |
| Option 5 | | A (Dx3) | | B (Dx3) | | | A (reset) | | | | |
| Option 6 | | A (Dx3) | | | | B (Dx5) | | | A (reset) | | |
| Option 7 | | | A (Dx5) | | | B (Dx1) | A (reset) | | | | |
| Option 8 | | | A (Dx5) | | | B (Dx3) | | | A (reset) | | |
| Option 9 | | | A (Dx5) | | | | | B (Dx5) | | | A (reset) |

Dx1 denotes 1-slot packet
Dx3 denotes 3-slot packet
Dx5 denotes 5-slot packet
(reset) indicates that, on reaching this slot, a cycle is completed and this slot becomes the new "slot 1".

The options shown in Table 3 are referenced against Channel Blacklist Table 36 and Channel Frequency Look-Ahead Table, found in Table 2, and are used to determine what length packets should be used to avoid "bad" channel frequencies. For instance, slots 3 and 6, in the seven slot look-ahead example, are "bad." Options are selected which will not begin a transmission in slots 3 or 6, which means that options 1, and 7–9 should not be used, as those options begin transmission in slots 3 or 6. The completely safe options, then, are options 3, 5, 6 and 8. as these options avoid beginning transmission in slots 3 or 6, and also prevent any beginning transmission before slot 7. Options 1, 2 and 4 do not begin transmission in slots 3 or 6, however, once reset, the next option may or may not begin transmission in slot 3 or 6, however, assuming that the protocol of the invention is working properly, slots 3 and 6 will be avoided.

The packet type of the final transmission by device "A" illustrated in Table 3, option 1, is not relevant, i.e., the algorithm considers the next two transmission slots only. Device "A" resets at the slot 3 of its next transmission, which assumes the characteristics of slot 1. The important factor is determining where this transmission must start. e.g., for option 1, device "A" must start its second transmission in slot 3. Assuming device "A" implements this invention, as soon as it needs to transmit again, i.e., slot 3 for option 1, algorithm 44 will be reset and this new slot location will effectively be a new slot 1, but as it is still scheduled to be on channel frequency 19, and it needs to avoid beginning anything in this slot, regardless of whether the slot is designated as slot 3 or slot 1. This is why, for this example, Table 3, Option 1 should be avoided.

Interference Avoidance—General Principles

In general, interference avoidance algorithm 44 tries to cause selection of a transmission option (1 through 9) which avoids requiring device "A" or device "B" to begin transmission in a slot known to use a "bad" blacklisted channel frequency.

Some of these transmission options should be avoided if certain of the slots 1 through 11, the preferred minimum look-ahead distance, are scheduled with a "bad" channel frequency. Table 4 indicates, for each transmission option, the slots which will be the start of a new packet transmitted by either device "A" or device "B".

TABLE 4

Packet Transmission Start Slots

Slots ahead of current slot (A's next transmission starts at slot 1)

| | 1 | 2 | 3 | 4 | 5 | 6 | 7 | 8 | 9 | 10 | 11 |
|---|---|---|---|---|---|---|---|---|---|---|---|
| Option 1 | X | X | X | | | | | | | | |
| Option 2 | X | X | | | X | | | | | | |
| Option 3 | X | X | | | | | X | | | | |
| Option 4 | X | | | X | X | | | | | | |
| Option 5 | X | | | X | | | X | | | | |
| Option 6 | X | | | X | | | | | X | | |
| Option 7 | X | | | | | X | X | | | | |
| Option 8 | X | | | | | X | | | X | | |
| Option 9 | X | | | | | X | | | | | X |

By using Table 4, it is possible to determine which of the nine potential transmission options from Table 3 should be avoided, on the basis of the location of any "bad" channel frequencies scheduled within the next 11 slots. The shaded areas in Table 4 indicates that the option is not relevant to the particular slot, as the algorithm resets to slot I in the preceding slot, as described above.

For example:

If slot 7 has a "bad" channel frequency scheduled, transmission options 3, 5 and 7 should be avoided.
If slot 8 has a "bad" channel frequency scheduled, all the transmission options are acceptable.

If slots 2 and 4 both have a "bad" channel frequency scheduled, transmission options 1 through 6 should be avoided.

The interference avoidance algorithm implements the general principles of avoiding the transmission option which will begin in a slot having a "bad" channel frequency assigned thereto given the knowledge of the bad channel frequency schedule from the look-ahead table.

Some special cases must be considered:

If slot 1 has a "bad" channel frequency scheduled, according to this rule, all the transmission options should be avoided. This is because device "A" must always transmit in slot 1, which means that the channel frequencies scheduled for slot 1 cannot be avoided. Because it is impossible to avoid all transmission options, the action taken in this scenario is to avoid transmission options 4 through 9, because these result in device "A" transmitting longer than necessary on the "bad" channel frequency allocated to slot 1. In this scenario it is also recommended that a DM1 packet be used by device "A" in slot 1; this is because a DM1 packet incorporates forward error correction (FEC), protection and, consequently, has an increased probability of successful transmission in a bad channel frequency than a DH1 packet, which has no FEC. An FEC scheme allows a limited number of errors in a packet's transmission to be recovered without need for retransmission.

In certain cases where there are multiple slots marked "bad," all of the transmission options are recommended as avoided (e.g. if slot 2,4 and 6 are marked as "bad"). In this case, it is again suggested that options 4 through 9 be avoided and that device "A" transmit a DM1 packet in preference to a DH1 packet. On the basis of the above general principles, interference avoidance algorithm 44 decides which packet type device "A" should next transmit.

In practice, the device is permitted more than one option in most cases, e.g., if there are no "bad" channels in the next 11 slots, device "A" is free to choose from among Dx1, Dx3 and Dx5 packets, or, if slot 2 is blacklisted, Dx3 or Dx5 packets may be selected. In this case, other decision processes in the BT device determine which packet type is used on the basis of other already implemented factors, e.g., the amount of data to be transmitted. Interference avoidance algorithm 44 may be looked upon as providing a list of packet lengths and types that the device should not use, to constrain the traditional selection processes by the device.

It should be appreciated that device "A," beginning transmission in slot 1, will not know whether device "B" will respond with a Dx1, Dx3 or Dx5 packet. Device "A" will not always be able to distinguish between, for example, transmission options 1, 2 or 3, which has an impact on the specific design of the algorithm for such scenarios. Devices incorporating the invention will perform more efficiently if both device "A" and "B" implement the algorithms, as device A does not need to concern itself with the possible packet selections of device "B," because "B" will separately adapt its selection to prevent transmission on a "bad" channel.

Thus, in the case where device "A" incorporates the invention, and device "B" does not, Table 4 collapses. Table 4A depicts the options where only one device, assumed to be device "A", incorporates the invention.

TABLE 4A

Packet Transmission Start Slots Where Only One Device Looks-Ahead

| | Slots ahead of current slot (A's next transmission starts at slot 1) | | | | | | | | | | |
|---|---|---|---|---|---|---|---|---|---|---|---|
| | 1 | 2 | 3 | 4 | 5 | 6 | 7 | 8 | 9 | 10 | 11 |
| Option 1–3 | X | X | X | | X | | X | | | | |
| Option 4–6 | X | | | X | X | | X | | | | |
| Option 7–9 | X | | | | | X | X | | | X | X |

Given the scenario, as shown in Table 4A, where only one device incorporates the invention, and given that slots 3 and 6 have a "bad" channel frequency, option 1 is not a good choice, as it will force device "A" to begin transmission on a bad channel frequency in slot 3. In this case, any option where device "A" initially send a Dx1 packet, Options 1–3, Table 3) have risk of incomplete data transfer because device "A" does not know what length packet device "B" will transmit next. If device "B" chooses to transmit a Dx1 packet, then option 1 has been selected by device "B." However, if device "A" transmits a Dx3 or Dx5 packet (Options 4–9), we know with certainty that the "bad" channel frequency in slot 3 is avoided regardless of what length packet is transmitted by device "B."

Additional algorithms are possible, tailored to different operational scenarios or requirements such as:

whether device A alone implements the algorithm, or whether both device A and device B implement the algorithm, as described in connection with Table 4A;

the desired communications characteristics, which depend on application, e.g., highly asymmetric, high rate communications for file transfer; high-rate, symmetric communications for video-telephony, etc;

which packet types the BT devices are capable of using, as some manufacturer's implementations may have restrictions on packet type and length, e.g., some devices may not support Dx5 packet types; and which packet types are permitted in a particular communications exchange, as the master might limit which packets a slave is permitted to use.

In the ideal case, a BT device will implement a combination of interference avoidance algorithms, based on the principles described above, to maximize performance in all the expected operational scenarios.

Figure 8:
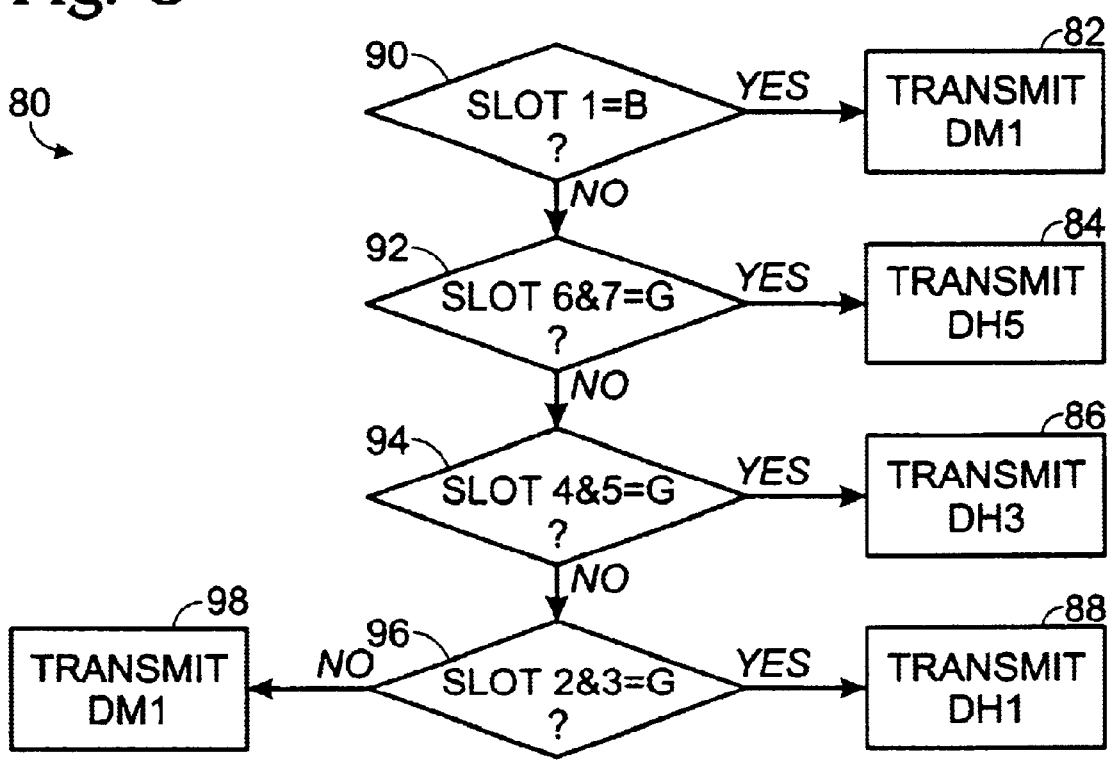
FIG. 8 illustrates a decision process used in the invention.

In this example, and now referring to FIG. 8, a specific example of the decision process of interference avoidance algorithm 44 is described, wherein device "A" is a master device and device "B" is a slave device which does not implement this invention. Remembering that the master may limit the packet types which a slave may utilize, this example assumes that device "B" has been limited to only using Dx1 packets. It is also assumed that device "A" is performing a large file transfer, so that it prefers to use the largest packet size possible to complete the transfer as soon as possible.

The action which device "A" takes, on the basis of slots "bad" channels scheduled for slots 1–7, as illustrated in FIG. 8, is an illustrative example of an interference avoidance algorithm. Using the information regarding near-future "bad" channel frequency assignments, the interference avoidance algorithm adapts the packet-length to be used in the next transmission, blocks 82, 84, 86, 88, so that the "bad"

channels may be avoided. This is done by helping to ensure that bad channels fall in a slot, blocks 90, 92, 94, 96, 98, which is in the middle of a longer packet type (Dx3 or Dx5), rather than in a slot, where a new packet transmission commences. Each time a device which implements this algorithm is ready to transmit a new packet, it will select the packet to be used using information provided by interference avoidance algorithm 44.

Referring to Table 3, it is clear that only transmission options 1, 4 and 7 are relevant to this example, as options 2, 5 and 8 require device "B" to use Dx3 packets, and options 3, 6 and 9 require device "B" to use Dx5 packets. It may also be seen, by looking at the options as displayed in Table 4, a look-ahead of only seven slots is all that is needed, because bad channel frequencies marked in slots 8 to 11 have no relevance to options 1, 4 and 7.

A legacy device will simply transmit DH5 packets continuously and occasionally an entire DH5 transmission will be lost because it begins transmission in a bad channel frequency slot. The DH1 packet transmission by device "B," which follows every device "A" DH5 transmission contains the acknowledgement for the preceding DH5 transmission. If this DH1 packet is not received, or contains errors, the DH5 packet is effectively lost, even if it was transmitted error free. This means that if either device "A" or device "B" transmits on a bad channel frequency, data loss will occur, resulting in a negative QoS impact. With this algorithm, however, many otherwise failed DH5 transmissions will instead be converted to successful DH3 or DH1 transmissions. This helps to maintain the throughput performance of the BT communication despite the presence of considerable interference, e.g., if slot 6 is designated "bad," a Dx3 packet will be selected, which means that device "B's" transmission does not begin in slot 6, where data would likely be corrupted.

Figure 9:
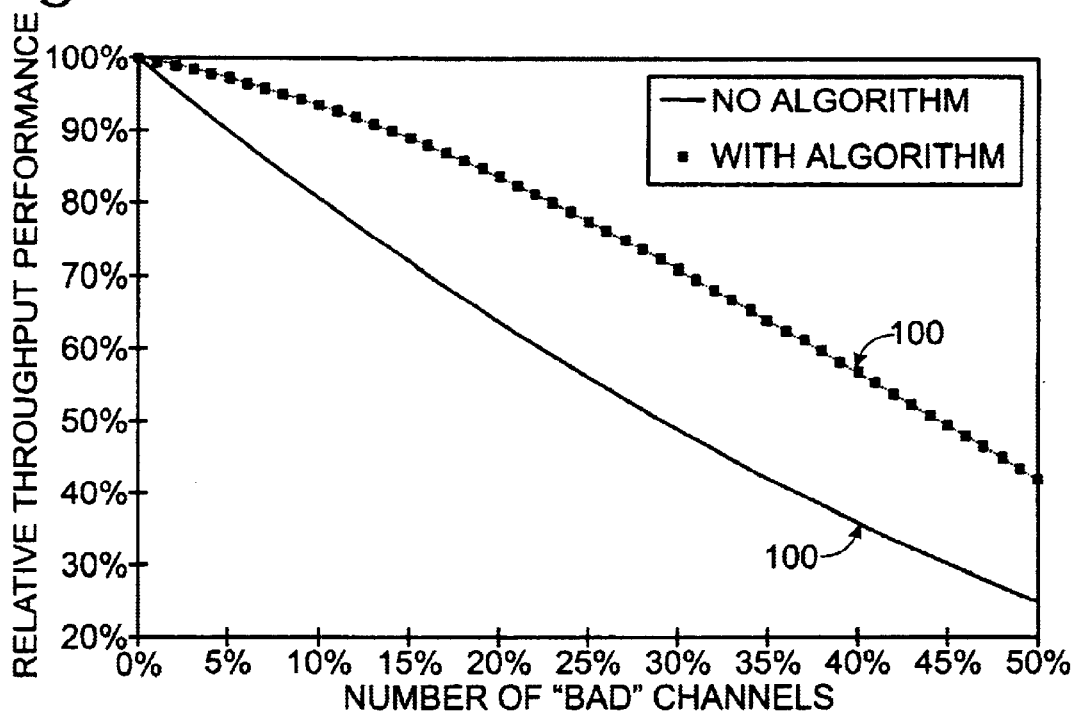
FIG. 9 is a graph of potential throughput performance gain of the interference avoidance algorithm of the invention.

FIG. 9 below provides an illustrative estimate of the performance gain that might be expected by implementing the example algorithm described above in a BT device. One important fact to remember is that, in this scenario, only device "A" requires this algorithm for the performance gain to be realized. Device "B" may be a legacy BT device without any knowledge of the interference avoidance algorithms implemented in device "A".

Tests involving microwave ovens indicate that, within 1 meter of the oven, up to 40% of the 79 BT channels are badly interfered, while at distances of 3–8 meters, the number of interfered channels drops to 15–20%. In both scenarios, the algorithms described herein provide a significant performance advantage in terms of achievable throughput. At 40% interfered channels, 100 in FIG. 9, a system employing this algorithm potentially has a 60% of maximum throughput, while a legacy system has about a 35% of maximum throughput.

It is also important to note that, in addition to the throughput performance benefit, the algorithm will reduce the number of link failures that occur. These failures occur because the system will generally only permit a certain number of re-transmission attempts for each packet before it assumes a link has been lost and tears-down the connection.

Figure 10:
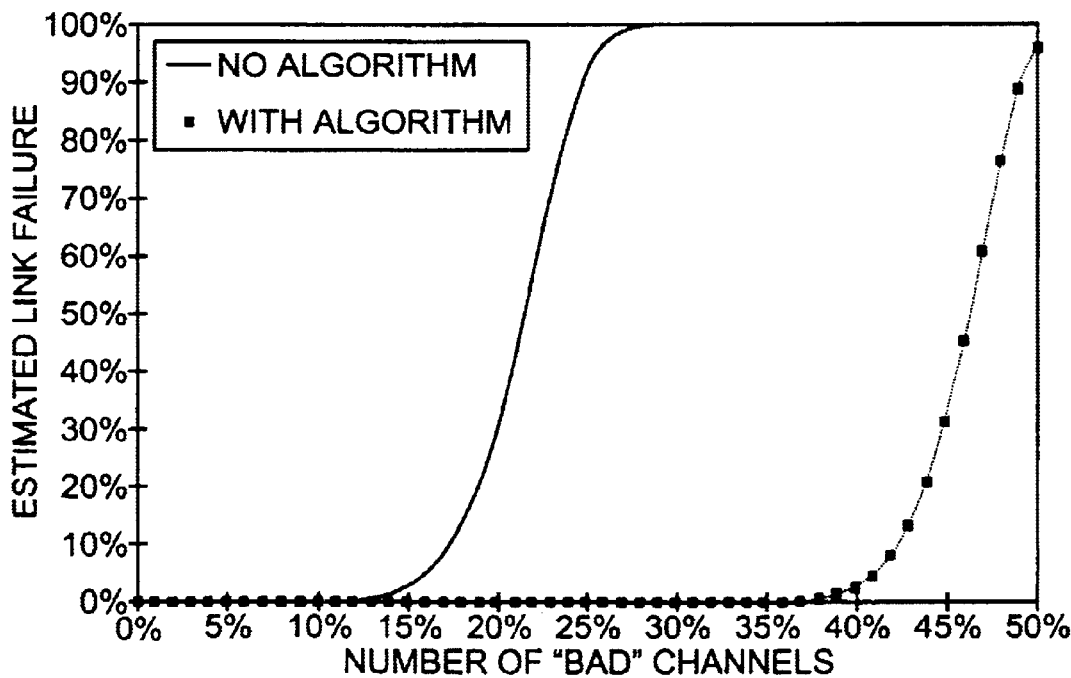
FIG. 10 is a graph of potential improvement in link failure performance of the interference avoidance algorithm.

FIG. 10 depicts a hypothetical improvement in the link failure given an example scenario where a maximum of 10 retries are permitted before the link is assumed to have failed, and a file of approximately 250 kbytes is being transferred. (250 kbyte file transfer, max retries 10). Assuming an efficient file transfer scenario, the algorithm should provide approximately 25% improvement in link robustness. The gain is approximately 25% regardless of the setting of the parameter "max retries." Without the algorithm, the system essentially collapses when greater than 15% of the channels are "bad". With the algorithm, link performance may be maintained when up to 40% of the channels are "bad".

Given that a nearby, interfering microwave oven is likely to impact between 15% and 40% of the channels, it is clear that this invention provides an implementation of BT which is robust to microwave interference, while prior art, legacy devices are not, and will suffer link failure in almost every case of attempted file transfer, under microwave oven interference. Because a BT device incorporating the invention can communicate robustly with a prior-art BT device under the same interference conditions, the benefits of the invention are still realized for communications between devices incorporating the invention and legacy devices.

FIGS. 9 and 10 are based on estimates which assume that slots which have."bad" channel frequencies are randomly distributed in time. Because the BT hopping sequence is designed to have highly pseudo-random characteristics, this approximation is relatively accurate. In practice, however, it is still an approximation and the distribution of "bad" slots may not be random in time.

This invention may be readily adapted to any other communications system, which employ similar frequency hopping and multi-slot packet principles. The invention may be adapted to include more than one bit per channel frequency in the channel blacklist table. This allows each channel frequency to have a more subjective quality rating than just "good" or "bad". This modification is accompanied by changes in the blacklist maintenance algorithm and interference avoidance algorithms to accept the increased information on channel frequency quality. This adaptation provides better performance in cases of very high interference, albeit at increased implementation complexity.

The preferred embodiment for "look ahead" distance is eleven slots. However, alternative embodiments may look-ahead by fewer or more slots. The interference avoidance algorithm will also differ according to the available look ahead information. It should be appreciated that the foregoing description only considers the immediate next transmission of device "A" and device "B". Other implementations of the invention may look further ahead, to provide additional interference avoidance algorithm processing time.

A wide range of interference avoidance algorithms are possible. Any algorithm which uses the basic guiding principles of this invention, i.e., dynamically using multi-slot packets in an intelligent manner to avoid transmission on "bad" channels, which are maintained in a separate list, is an alternative embodiment.

Important features of the invention are: (1) a device implementing the invention may communicate with an unmodified, legacy device that does not implement this invention; (2) the invention does not necessarily require both communicating devices to implement the invention in order for performance benefits thereof to be realized; (3) in general, the interference avoidance algorithms will be simpler and more efficient if both communicating devices implement the invention; (4) if only one device implements the invention, there is no requirement for this device to be the master of the BT communication for benefit to be realized; and (5) a BT slave which implements this invention may have been restricted in its choice of packet types by the master device during connection establishment. This invention will still provide benefit as long as the slave may chose from at least two different length packet types, albeit with slightly reduced effectiveness. The invention may be used in connection with any frequency hopping protocol which uses data packets of different lengths.

Thus, a method and system for improved microwave interference robustness in Bluetooth™ devices has been disclosed. It will be appreciated that further variations and modifications thereof may be made within the scope of the invention as defined in the appended claims.

I claim:

1. A RF communications system having improved RF interference characteristics for use with at least a pair of RF transceivers which communicate using a packet transfer protocol, in a frequency hopping scheme, wherein the packets are of equal or various lengths, wherein each frequency occupies a frequency channel slot in a RF band, and wherein a subsequent frequency is known, comprising, in at least one of the transceivers:

a detector for detecting distressed channel frequencies having an unacceptable level of interference thereon;

a tracker for keeping track of said distressed channel frequencies and of channel frequencies which are not distressed; and a frequency selector for selecting a next transmission frequency from the available non-distressed channel frequencies, including a look-ahead mechanism for determining which channel frequencies will be used in subsequent frequency channel slots, and an interference avoidance mechanism for determining, from said tracker, which of the subsequent frequency channel slots is scheduled to operate at a distressed frequency, and wherein said frequency selector avoids beginning transmissions in any frequency channel slot associated with a distressed channel frequency by adjusting the schedule.

2. The system of claim 1 wherein said frequency selector avoids transmission by using packets of lengths to avoid distressed channel frequencies.

3. The system of claim 1 wherein said detector includes a scanning receiver in a transceiver for scanning all frequencies within the RF band.

4. The system of claim 3 wherein said scanning receiver includes a received signal strength threshold setting, and wherein a scanned frequency having a received signal strength above said threshold is designated a distressed frequency.

5. The system of claim 1 wherein said detector includes a CRC code detector, and wherein, upon detection of a CRC code indicating an error in transmission of a packet on a frequency, said CRC code detector sets the frequency to a distressed condition.

6. The system of claim 5 wherein said detector further includes a time-out mechanism for setting a frequency to a non-distressed condition after passage of a predetermined time.

7. A method of improving RF interference characteristics in a RF communications system having at least a pair of RF transceivers which communicate using a packet transfer protocol, in a frequency hopping scheme, wherein the packets are of equal or various lengths, wherein each frequency occupies a frequency channel slot in a RF band, and wherein a subsequent frequency is known, comprising, in at least one of the transceivers:

detecting distressed channel frequencies having an unacceptable level of interference thereon including detecting a CRC code indicating an error in transmission of a packet on a frequency, and setting such frequency to a distressed condition, and setting a distressed frequency to a non-distressed condition after passage of a predetermined time;

tracking distressed frequencies; and selecting for use by the system only those channel frequencies which are not distressed.

8. The method of claim 7 wherein said selecting includes using packets of different lengths to avoid distressed frequencies.

9. The method of claim 7 wherein said detecting includes scanning all frequencies within the RF band.

10. The method of claim 9 wherein said scanning includes finding frequencies having a received signal strength above a predetermined threshold.

11. A method of improving RF interference characteristics in a RF communications system having at least a pair of RF transceivers which communicate using a packet transfer protocol, in a frequency hopping scheme, wherein the packets are of equal or various lengths, wherein each frequency occupies a frequency channel slot in a RF band, and wherein a subsequent frequency is known, comprising, in at least one of the transceivers:

detecting distressed channel frequencies having an unacceptable level of interference thereon, wherein said detecting includes detecting a CRC code indicating an error in transmission of a packet on a frequency and setting such frequency to a distressed condition;

tracking distressed frequencies; and selecting for use by the system only those channel frequencies which are not distressed, including looking ahead to determine which frequencies are used for future frequency channel slots, and assigning packet lengths to avoid beginning transmission in a frequency channel slot having a distressed frequency.

12. The method of claim 11 wherein said detecting includes scanning all frequencies within the RF band.

13. The method of claim 12 wherein said scanning includes finding frequencies having a received signal strength above a predetermined threshold.

14. The method of claim 11 wherein said detecting includes setting a distressed frequency to a non-distressed condition after passage of a predetermined time.

* * * * *